May 6, 1930.  E. A. GALLISON  1,757,013
FISH FILLETING MACHINE
Filed Jan. 25, 1928   7 Sheets-Sheet 3
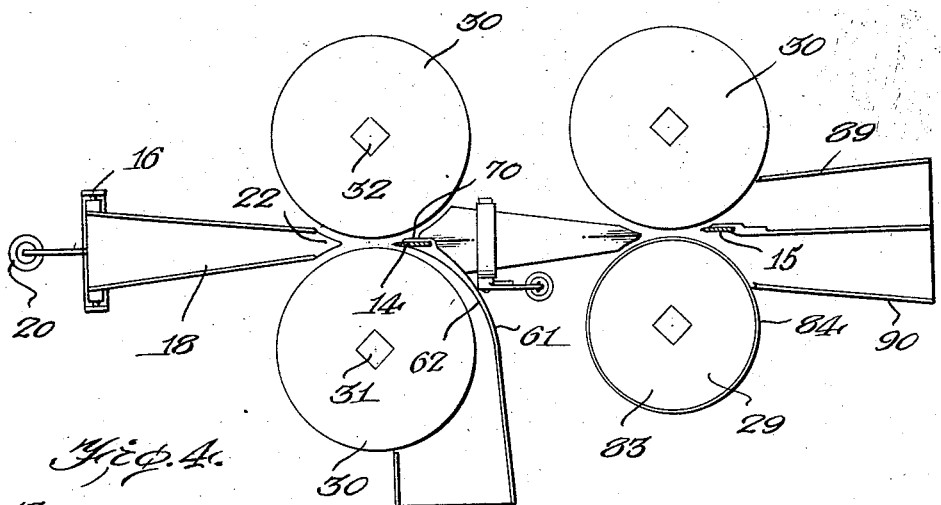
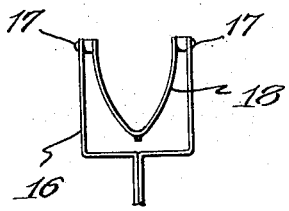
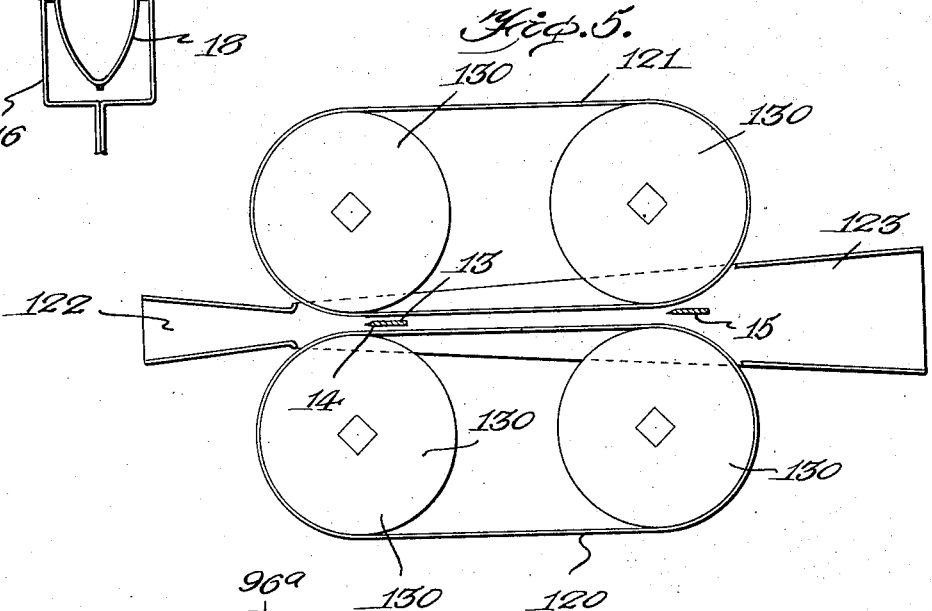
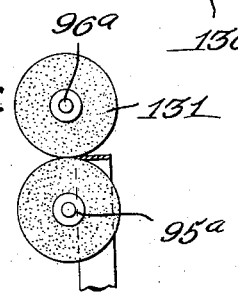
Inventor
Ernest A. Gallison
By Roberts Cushman & Woodbury
Attorneys May 6, 1930.  E. A. GALLISON  1,757,013
FISH FILLETING MACHINE
Filed Jan. 25, 1928   7 Sheets-Sheet 4

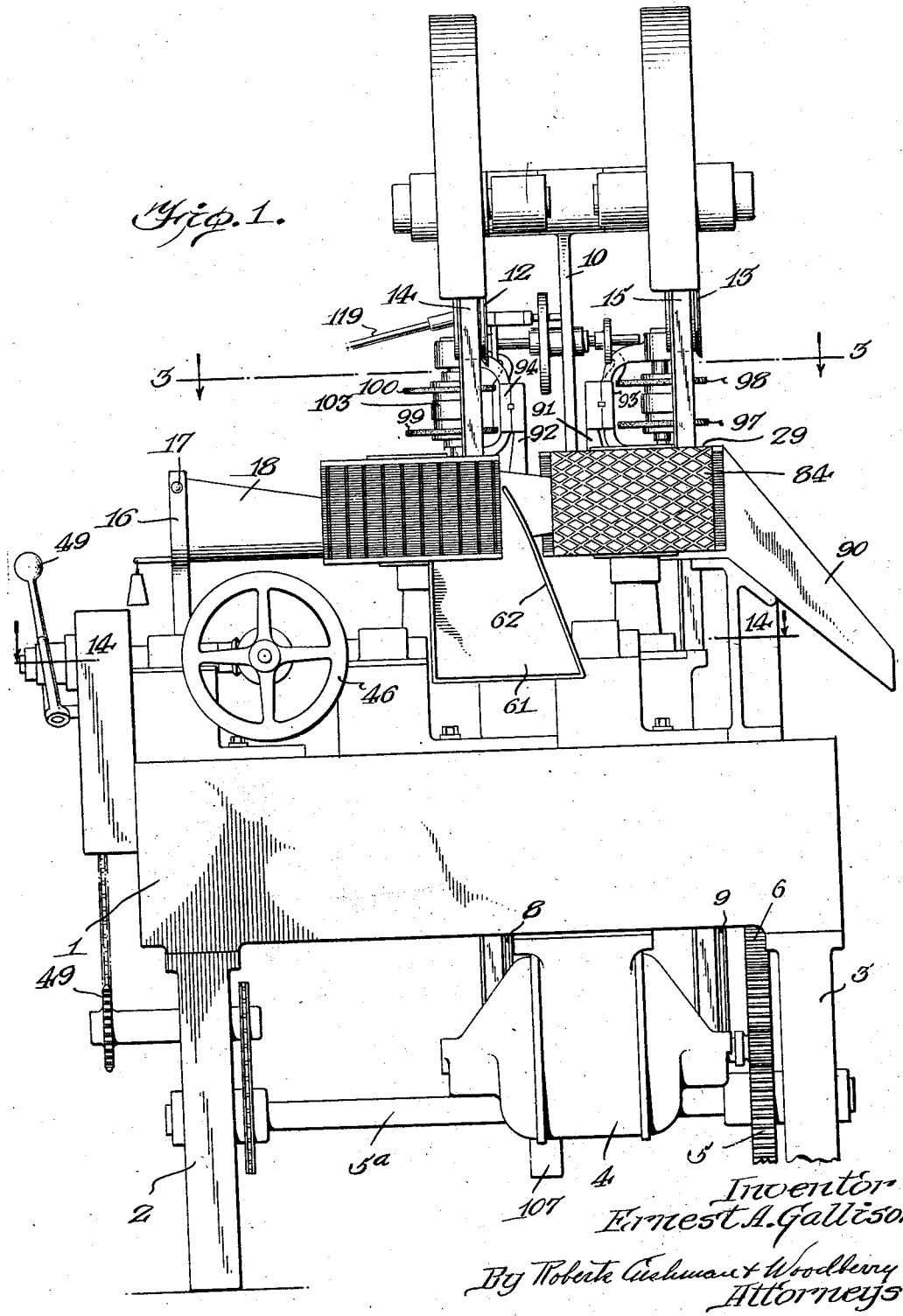

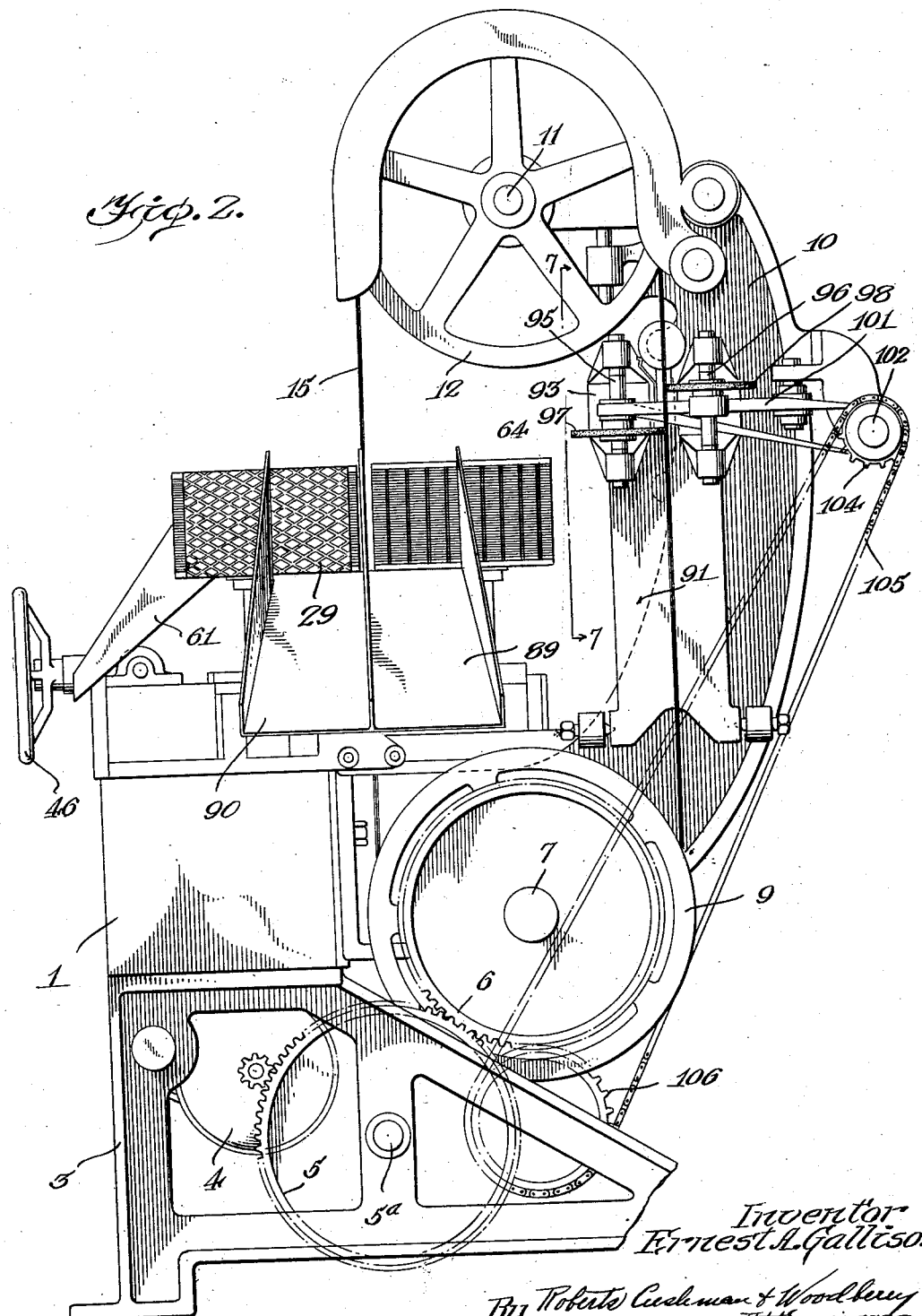

Fig. 7.

Inventor
Ernest A. Gallison
By Roberts Cushman & Woodberry
Attorneys

May 6, 1930.  E. A. GALLISON  1,757,013
FISH FILLETING MACHINE
Filed Jan. 25, 1928  7 Sheets-Sheet 5
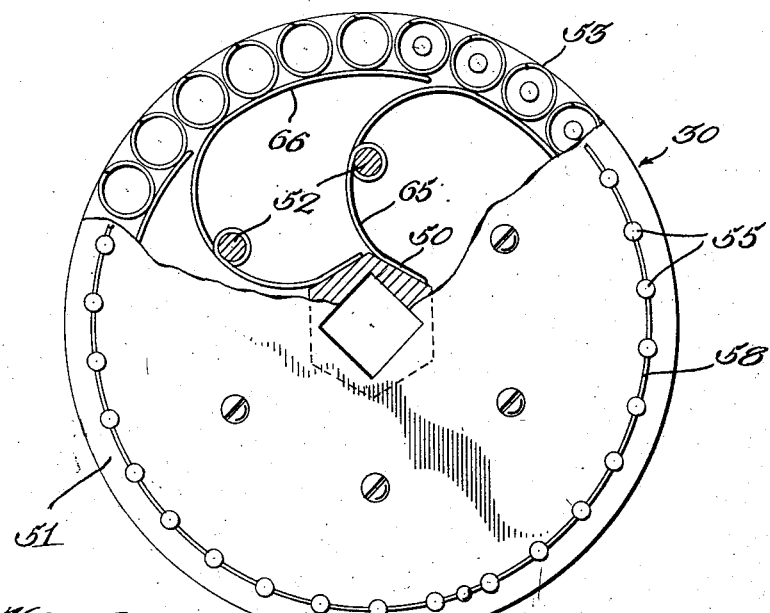
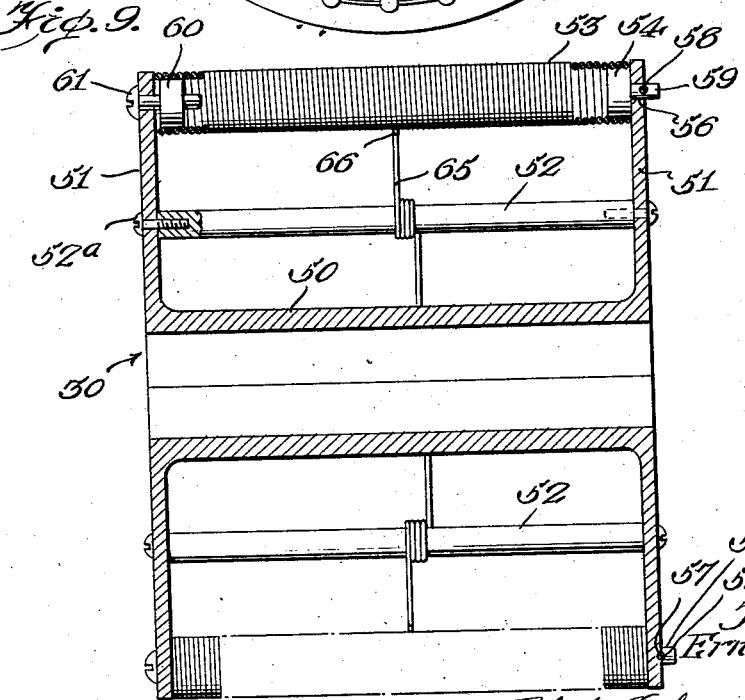
Inventor
Ernest A. Gallison
By Roberts Cushman & Woodberry
Attorneys May 6, 1930. E. A. GALLISON 1,757,013
FISH FILLETING MACHINE
Filed Jan. 25, 1928 7 Sheets-Sheet 6
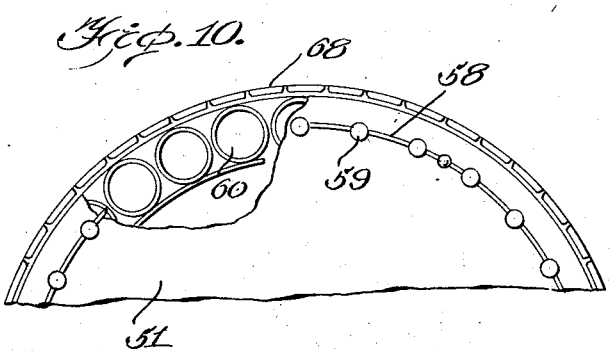
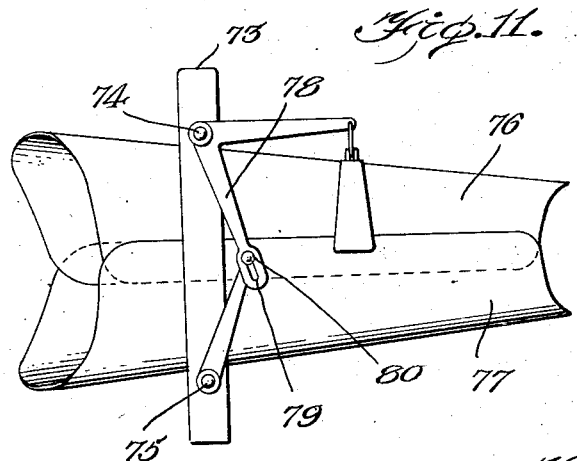
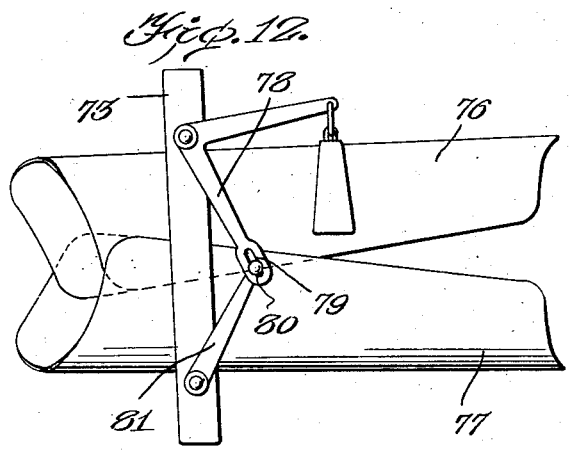
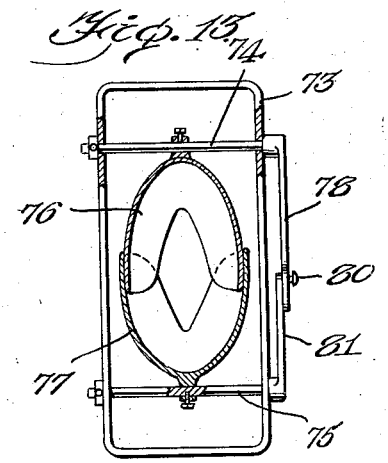
Inventor
Ernest A. Gallison
By Roberts Cushman & Woodberry
Attorneys

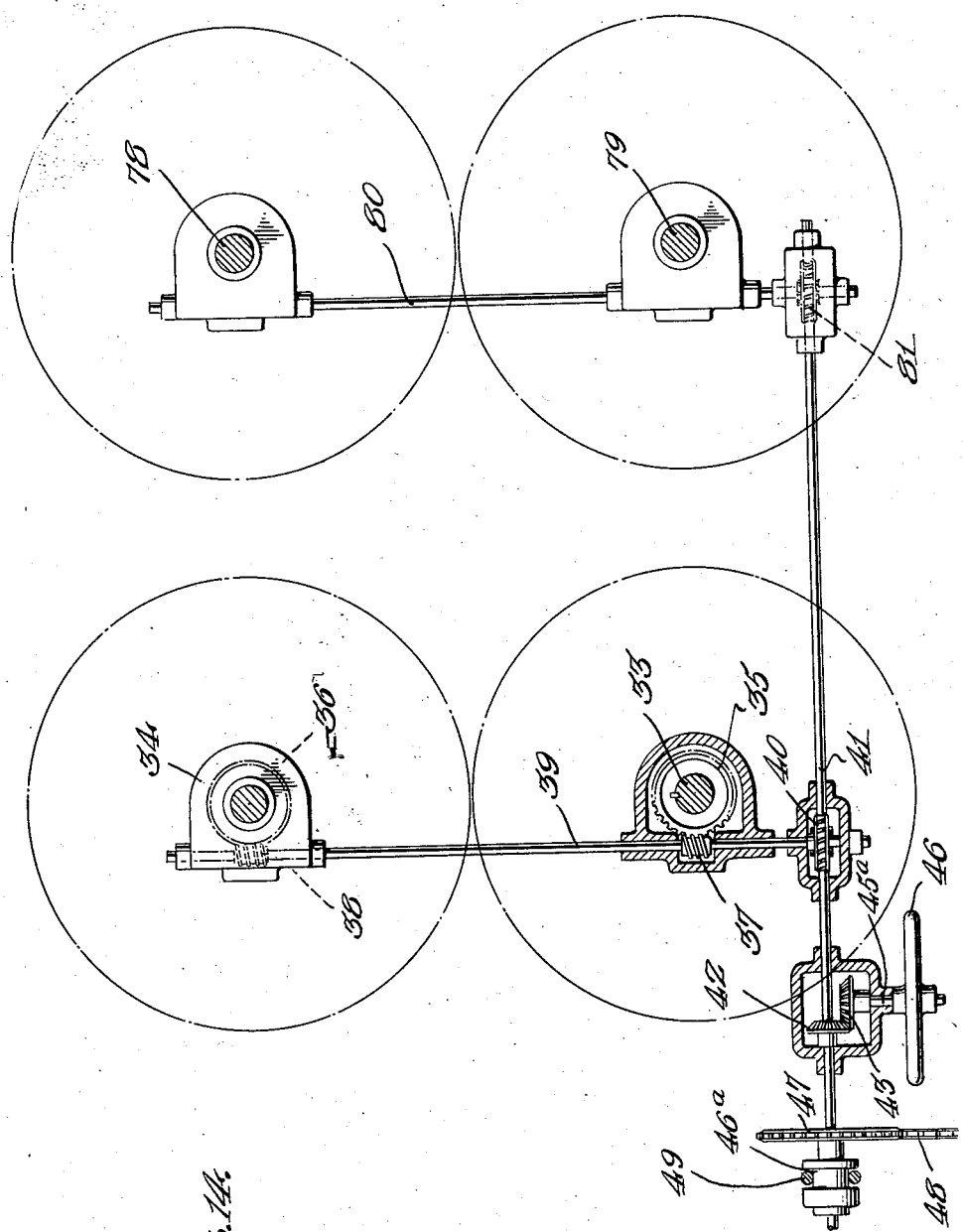

Patented May 6, 1930

1,757,013

UNITED STATES PATENT OFFICE

ERNEST A. GALLISON, OF WATERTOWN, MASSACHUSETTS, ASSIGNOR, BY MESNE ASSIGNMENTS, TO BAY STATE FISHING COMPANY, OF BOSTON, MASSACHUSETTS, A CORPORATION OF MASSACHUSETTS

FISH-FILLETING MACHINE

Application filed January 25, 1928. Serial No. 249,259.

This invention pertains to apparatus for dressing fresh fish and more particularly to a mechanism for removing fillets from opposite sides of the fish leaving the backbone, and in some cases the dorsal and ventral fins, in a single thin slice which is discharged from the machine as waste.

In accordance with the present invention, the head of the fish is first removed in any desired manner, either by hand or machine, and the fish is then thrust tail first between relatively movable guides until it is seized between a pair of feeding elements, for example opposed rolls or belts. As the fish is advanced by the feeding means it engages a cutting blade which removes the fillet from one side; the fish continues to advance, and after passing through a second set of guides engages a second cutter blade which removes the fillet from the opposite side. The machine also includes means for delivering the fillets and backbone slices into different receptacles and means for cleaning and sharpening the cutter blades.

In the accompanying drawings I have illustrated a specific embodiment of my invention by way of example, together with certain suggested modifications, it being understood that in so far as its broader aspects are concerned, the present invention is not dependent upon or limited to the exact details of construction herein shown and described.

In the drawings,

Fig. 1 is an elevation of the right-hand side of the machine, certain parts being broken away or omitted;

Fig. 2 is a rear elevation of the machine;

Fig. 3 is a horizontal section of more or less diagrammatic character substantially on the line 3—3 of Fig. 1, and omitting many of the parts;

Fig. 4 is a front elevational view of the fish guiding member which adjoins the first pair of feed rolls;

Fig. 5 is a view corresponding to Fig. 3 but showing a modified form of the invention;

Fig. 6 is a sectional detail showing the arrangement of the cutting knife and sharpening elements;

Fig. 7 is a fragmentary vertical section substantially on the plane of line 7—7 of Fig. 2, but largely in scale;

Fig. 8 is a broken elevational view of a typical feed roll;

Fig. 9 is a central longitudinal sectional view through a feed roll of this character, a portion of one of the springs being broken away more clearly to show the mode of attachment thereof;

Fig. 10 is an elevational detail with parts broken away showing an optional form of feed roll;

Fig. 11 is a side elevational view of the intermediate guide means and related parts;

Fig. 12 is a view similar to Fig. 11 but showing the parts in a different position;

Fig. 13 is an elevational detail of the assembly shown in Figs. 11 and 12 parts being broken away;

Fig. 14 is a section substantially on line 14—14 of Fig. 1 indicating one desirable arrangement of driving means for feed rolls, etc.

Referring to the drawings, the numeral 1 designates the main frame of the machine which is conveniently supported upon legs or brackets 2 and 3 respectively. The frame 1 supports a motor 4 which drives a gear 5 on a shaft 5ª journalled in the end brackets 2 and 3. The gear 5 drives a gear 6 on a shaft 7 which is suitably journalled in the frame and this shaft 7 carries a pair of spaced flanged knife driving wheels 8 and 9.

The frame 1 carries an upstanding bracket 10 at its left-hand side and this bracket provides bearings for a shaft or shafts upon which a second pair of knife guiding wheels 12 and 13 are mounted in the vertical planes of wheels 8 and 9 respectively. Endless band knives 14 and 15 are wrapped around the aligned pairs of wheels.

Near the front of the machine is an upstanding bracket 16 of U shape at the upper portions of which are the pivots 17 supporting the trough like guide member 18 which is tapered in cross section having its smaller end juxtaposed to the first pair of feed rolls. A weight 20 normally tends to draw this end of the member 18 upwardly, it being understood that when a fish is fed into the same the weight of the fish will tend to swing the guide member downwardly an amount substantially corresponding to the size of the fish, whereby the latter is substantially centered vertically in relation to the first pair of feed rolls. The inner end of the trough member 18 is sharply tapered as designated by numeral 22 in order to fit closely about the rolls.

As the fish emerges from the rear end of the front guide it is seized between opposed feed rolls 30. These rolls are mounted upon the upper squared ends 31 and 32 of a pair of substantially vertical shafts 33 and 34 respectively. These shafts are journalled in suitable bearings in the main frame of the machine and are provided with worm wheels 35 and 36 respectively which mesh with worms 37 and 38 on a shaft 39. The worm wheels 37 and 38 are of opposite pitch so that when the shaft 39 is rotated the shafts 33 and 34 turn in opposite directions. The shaft 39 carries a worm wheel 40 which meshes with a worm on a longitudinally extended shaft 41, the latter preferably being provided with a bevelled gear 42 meshed with a gear 43 and on a shaft 45$^a$, carrying a hand wheel 46 by means of which the shaft 41 may be turned. The shaft 41 also carries a sprocket wheel 47 driven by means of a chain 48 passing around a sprocket wheel 49 which receives its motion through suitable connections from the shaft 5$^a$. The sprocket wheel 47 is carried by a sleeve 46$^a$ loose on the shaft 41, such sleeve having clutch elements engageable with a shiftable clutch member splined to the shaft shiftably movable into and out of engagement with the clutch elements on the sleeve 46$^a$ by means of a handle 49. Vertical shafts 78 and 79 carry gears that mesh with a second transverse shaft 80, corresponding to shaft 39 and being similarly driven by shaft 41 through worm gearing 81.

Referring to Figs. 8 and 9, each feed roll 30 preferably comprises a central sleeve 50 having a square opening fitting over the end 31 of shaft 33. The ends of this sleeve receive end plates 51 which may be integral with the sleeve or secured thereto in any suitable manner. A plurality of braces 52 extend transversely between the two plates 51 being tapped to receive screws 52$^a$ as shown in Fig. 9. The periphery of roll 30 carries a plurality of coil springs 53, each of which is closely wound. A plug 54 is secured in any suitable manner as by soldering to one end of each spring 53 and has an outstanding pin 55 that extends through an opening 56 in one of the plates 51. This plate may have a shallow annular groove 57 which receives one side of a wire ring 58 that passes through an opening 59 in each of the pins 55, thereby locking the same in position and retaining one end of each spring in proper engagement with one of the plates 51. The opposite end of each spring receives a suitable plug 60 which may be also soldered thereto. This plug preferably is internally threaded to engage a screw 61 passing through a suitable opening in an end plate 51 whereby the opposite ends of the springs may be retained in position. Due to the close winding of the springs there is little tendency for them to have too much flexibility in a direction perpendicular to the axes of the roll. However, if desired I may provide resilient reinforcing elements 65 to support the mid portion of each spring. Each of these resilient elements comprises a piece of wire having one end engaging the mid portion of a plurality of coil springs 53 as designated by numeral 66 and having an intermediate portion coiled around a reinforcing portion 52 while its opposite end engages a face of the central sleeve 50; thus each spring wire 65 tends to urge the intermediate portion of several springs 53 slightly outward. It is to be understood however that the use of wires 65 is entirely optional and that the rolls will function satisfactorily without the same. If desired the operating faces of these feed rolls may be provided with a thin layer 68 of corrugated rubber or the like in order to grip the surface of the fish (Fig. 10). However, it has been found that the springs themselves, without a covering of any kind, engage the pliable flesh of the fish in order to feed the same in a satisfactory manner and yet do not have a sufficiently harsh action to injure the flesh of the fish.

As the first fillet is sliced by the blade 14, it is received in a laterally extending guide chute 61 having a substantially vertical, curved wall 62, which, as indicated in Fig. 3, approaches very closely to the right-hand surface of the blade 14 and holds the fillet against the adjoining feed roll. The fillet delivered into the guide chute 61 may be discharged into any suitable receptacle placed beneath the end of the chute. Preferably the wall 62 carries a supporting and protecting plate 70 for the blade 14 so that only the cutting edge of this knife is exposed in the region of the path of the fish; and accordingly the blade is prevented from turning or twisting due to accidental catching upon the backbone of the fish which passes close to the same.

Figs. 11, 12 and 13 show in greater detail the guide for the fish between the first and second rolls; as shown more particularly in Fig. 3, the front portion of these guide members is somewhat unsymmetrical to permit the same fitting close about the fillet guide 62. The intermediate guide is provided with a suitable supporting bracket 73 which carries a pair of transverse shafts 74 and 75. These shafts are secured to the upper and lower guide members 76 and 77 respectively which are tapered so that they fit in juxtaposition to the second pair of feed rolls; preferably these guides are provided with edge portions which overlap each other as shown more particularly in Fig. 13. Secured to one of the transverse shafts, such as the shaft 74, is a downwardly inclined link 78 which has a slot 79 adjoining its lower end. This slot 79 receives a suitable pin 80 upon a link 81 which is fixed to the transverse shaft 75. It is thus evident that downward movement of the lower guide member 77 will swing to link 81 in such a manner as to swing the link 78 upwardly, thereby moving the guide element 76 upward an amount corresponding to the downward movement of the lower guide element; consequently the movement of a fish into the guide element will result in the equalized spreading apart of these members and a resultant centering of the fish in relation to the second pair of feed rolls. As is the case with the first guide element, the elements 76 and 77 are provided with pointed end portions closely to fit between juxtaposed portions of the second pair of feed rolls (Fig. 3). The intermediate guide elements and the cutting knives are so arranged that, in effect, the knives are offset in relation to the path of the fish whereby the backbone may readily pass to one side of blade 14 and to the opposite side of blade 15.

Referring to Fig. 3, it may be seen that one of the second pair of feed rolls is similar in construction to the rolls described above while the opposing roll 29 may be somewhat smaller in diameter and comprises a wooden core 83 which carries a suitable corrugated rubber tread 84. These rolls are mounted upon the upper ends of shafts 78 and 79 respectively, roll 29 preferably being disposed adjoining that side of knife 13 which will engage the backbone of the fish. The relative difference in the sizes of the second pair of feed rolls results in a slight twisting effect upon the backbone slice, which deflects the tail and assists in guiding the same into proper engagement with the knife 14. Thus the second fillet may be delivered to a chute 89 while the waste remnant comprising the backbone and fins of the fish passes into chute 90, whence it may go to any suitable point for disposal. The roll 83 preferably has a central body portion 86 of some hard unyielding material, such, for example, as wood covered with a layer 87 of corrugated rubber.

Figure 7:
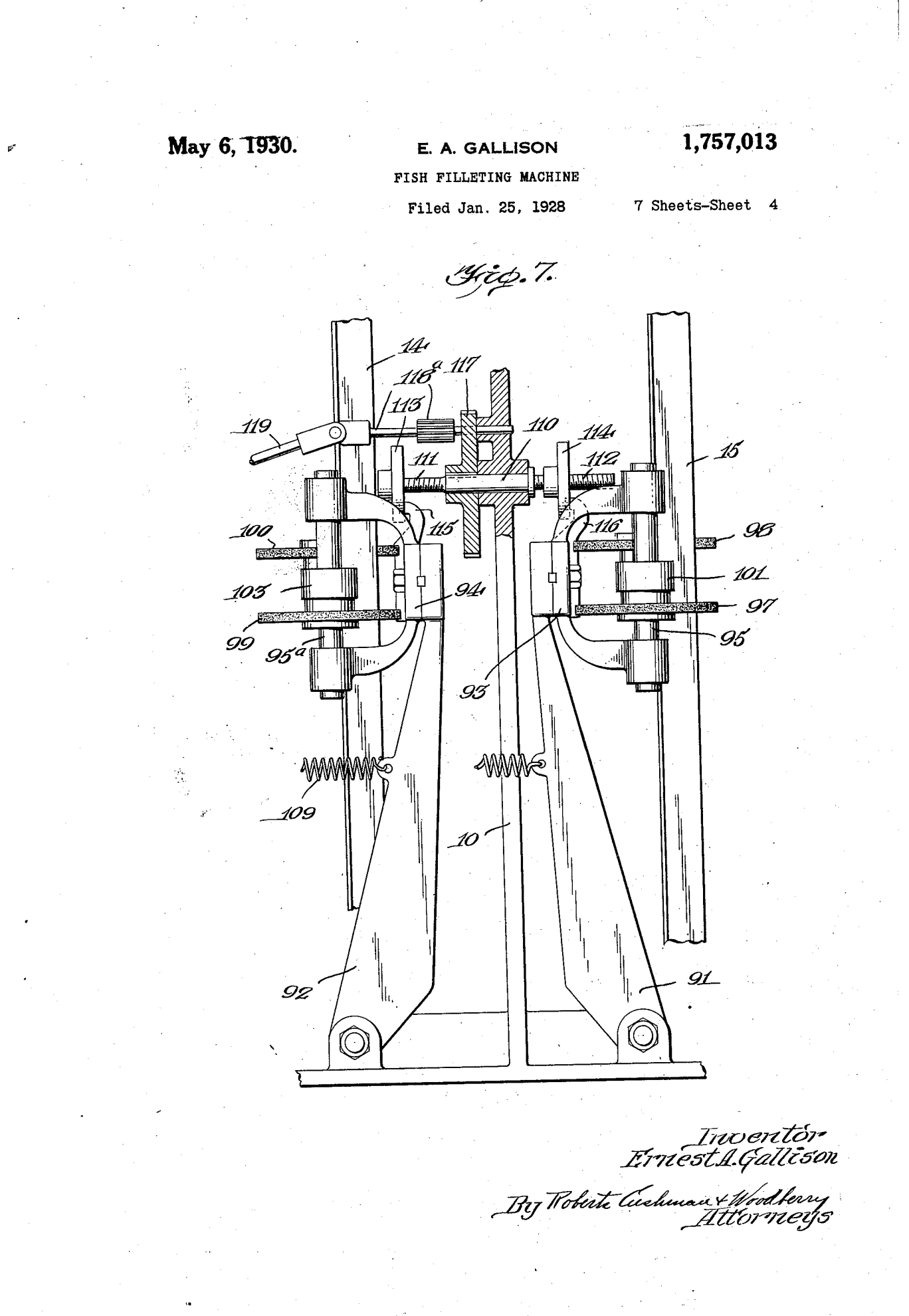

In order to insure a proper cutting edge on the knife blades, suitable sharpening apparatus is provided at the left-hand side of the machine. Referring to Fig. 7, the main frame supports a pair of lever arms 91 and 92 disposed respectively at opposite sides of the bracket 10. These arms project upwardly and carry brackets 93 and 94 respectively. The bracket 93 has bearings for a pair of substantially vertical shafts 95 and 96, disposed respectively at opposite sides of the blade 15. The shaft 95 carries a grinding wheel 97 and the shaft 96 carries a grinding wheel 98, these wheels being so disposed as to engage the knife blade 15 at opposite sides thereof.

The bracket 94 likewise carries a pair of vertical shafts 95ª and 96ª disposed at the opposite sides of the blade 14, and these shafts carry grinding wheels 99 and 100 adapted to engage the opposite sides of the blade 14.

The shaft 95 carries a pulley engaged by a belt 101, and this belt also engages a pulley carried by the shaft 96. This belt passes around a suitable pulley, not shown, mounted on a shaft 102 carried by a bracket that is supported by frame member 10. This shaft also carries a second pulley which drives a belt 103, passing around pulleys upon shafts 95ª and 96ª respectively. The shaft 102 carries a sprocket wheel 104 driven by a chain 105 from a sprocket 106 on a shaft which receives its motion through suitable gearing from the shaft 5ª.

Springs 108 and 109 tend to swing the arms 91 and 92 away from the knives. The member 10 carries a bearing for a shaft 110 having screw threaded portions 111 and 112 respectively which are engaged by nut members 113 and 114. These members 113 and 114 are engaged by stop arms 115 and 116 carried by the members 92 and 91 respectively, and thus constitute movable abutments for limiting the movement of the members 91 and 92 in response to springs 108 and 109.

The shaft 110 has a gear 117 fixed thereto, and this gear is adapted to mesh with a pinion 118 mounted upon a shaft adapted to slide endwise and to rotate in a bearing carried by the member 10. This shaft 118ª is provided with an actuating rod 119 having a handle, not shown, conveniently situated, by means of which the shaft 118ª may be moved endwise to cause the pinion 118 to mesh with the gear 117, and to turn such gear thereby rotating the shaft 110 and causing the nut members 113 and 114 to approach or recede. Such movement of the nut members moves the arms 91 and 92 and thus moves the brackets 93 and 94 so as to bring the rotating grinding wheels into operative engagement with the cutter blades.

Referring to Fig. 5, a slightly modified structure is shown comprising the cutting blades 14 and 15 and front and rear feed rolls 130. In this instance the front guide comprising the separable upper and lower members is replaced by a simple stationary funnel-like guide 122, and in this structure the feed rolls do not directly engage the fish but form guiding and driving means for a pair of spaced endless belts 120 and 121, which constitute the means for advancing the fish into engagement with the knives 13 and 14. In this instance, the fillets and the backbone slice all drop into the same chute 123, from which they are discharged into a common receptacle or from which they may be selected and separated by hand.

In order to clean the blades 14 and 15 before they are presented to the grinding wheels, wiping devices 130 and 131 of any suitable construction may be provided. Such wiping devices are not necessary, and may be dispensed with if desired.

In the operation of a machine of this character, it is to be understood that the fish, preferably after having its head removed, is introduced tail foremost into the first guide member 18, being directed in such a manner that the tail is seized between the first pair of feed rolls 30. These feed rolls, as previously described, have a suitable gripping action to engage the fish and carry the same past the first cutting knife 14. The springs 53 have suitable flexibility to permit the rolls to engage portions of fish having various sizes in an effective manner without bruising the flesh of the same. The first fillet passes into chute 61, while the backbone and the remaining fillet pass into the second guiding means 76—77 which delivers them properly centered to the second pair of feed rolls 30 and 29, where the second fillet is severed from the backbone slice and delivered to chute 89, while the slice including the backbone and the fins passes to chute 90.

While a preferred construction has herein been described, together with certain modifications thereof, it is to be understood that in its broader aspects the invention is not limited to the specific elements, arrangement of parts or proportions of parts herein specifically shown and described, but that the broad principle of the invention is capable of embodiment in apparatus of equivalent construction and within the scope of the appended claims.

I claim:

1. Apparatus of the class described, comprising means for successively removing a fillet from each side of a fish, and means for automatically delivering the two fillets and the median slice at different points.

2. Apparatus of the class described, comprising feed means for advancing a fish along a predetermined path and means for removing a fillet from one side of the fish, and a funnel-shaped guide for directing the fish toward the feeding means, said guide comprising separable parts engageable with the upper and under surfaces respectively of the fish, and means tending to cause said parts to approach each other.

3. Apparatus of the class described, comprising feed means for advancing a fish along a predetermined path and means for removing a fillet from one side of the fish and a funnel-shaped guide, said guide comprising separable upper and lower parts, a lever arm connected to each of said parts, means tending to move said parts toward each other, and means constraining said lever arms to move through substantially equal angles in opposite directions when a fish is inserted in the guide.

4. Apparatus of the class described, comprising a pair of feed rolls, a band knife adjoining juxtaposed portions of the feed rolls, and a tapered guide member to receive a part of a fish and center the same in relation to the rolls.

5. Apparatus of the class described, comprising a pair of feed rolls, a band knife adjoining juxtaposed portions of the feed rolls, and a tapered guide member to receive a part of a fish and center the same in relation to the rolls, said guide member being yieldably mounted to accommodate fish of various sizes.

6. A feed roll for a machine of the class described, comprising a plurality of peripherally disposed coil springs with their longitudinal axes paralleling the axis of the roll, and resilient means supporting the mid-portions of the peripherally disposed springs.

7. A feed roll comprising a plurality of peripherally disposed coil springs with their longitudinal axes paralleling the axis of the roll, said roll including end plates, and plugs in the ends of the springs holding them upon said end plates.

8. Apparatus of the class described, comprising a pair of band knives to cut opposite fillets from a fish, feed rolls adjoining each knife and guiding means between the rolls, the above-named parts being so arranged that one knife is offset in relation to the other whereby the backbone passes at opposite sides of successive knives.

9. Apparatus of the class described, comprising a pair of band knives to cut opposite fillets from a fish, feed rolls adjoining each knife and guiding means between the rolls, one of the second pair of rolls being of smaller diameter than the opposed roll to twist the tail portion away from the adjoining knife.

10. Apparatus of the class described, comprising a pair band knives to cut opposite fillets from a fish, feed rolls adjoining each knife and guiding means between the rolls, one of the second pair of rolls being of smaller diameter than the opposed roll to twist the tail portion away from the adjoining knife, said smaller roll being formed of comparatively rigid material and a layer of rubber surrounding said roll.

11. Apparatus of the class described comprising a pair of band knives to cut opposite fillets from a fish, feed rolls adjoining each knife and guiding means between the rolls, the above-named parts being so arranged that one knife is offset in relation to the other whereby the backbone passes at opposite sides of each knife, and a curved guide wall to divert the first-severed fillet from the path of the rest of the fish.

12. A feed roll for a machine of the class described, comprising a rotatable support, and a plurality of peripherally disposed elongate resilient elements carried thereby, said elements having their end portions secured to the support.

13. A feed roll for a machine of the class described, comprising a rotatable support, and a plurality of peripherally disposed coil springs carried by said support, said springs having their longitudinal axes paralleling the axis of the roll.

14. In an apparatus of the class described, the combination with feeding mechanism, of means providing a dilatable and constrictable passage for directing objects thereto, and means responsive to the weight of the objects for adjusting the size of the passage.

15. In an apparatus of the class described, the combination with feeding mechanism, of means providing a dilatable and constrictable passage for directing objects thereto, means tending to restrict the passage, and means responsive to the weight of objects for dilating the passage.

16. In an apparatus of the class described, the combination with feeding mechanism, of complementary members shaped to provide a convergent passage for directing objects to the feeding mechanism, means providing for the adjustment of the size of the passage, and means responsive to the weight of objects passing therethrough for effecting the adjustment of the size of the passage.

17. In an apparatus of the class described, the combination of means for advancing fish through a given path, means effective during the advance of the fish through the path for cutting and removing a fillet therefrom, and means effective thereafter and during the continued advance of the fish for separating the other fillet and the median slice.

18. In an apparatus of the class described, the combination of means for advancing fish in a given path, cutters disposed at points spaced longitudinally of the path, feeding mechanism cooperating with one cutter for cutting a fillet from the fish, means between the cutters for removing the cut fillet, and means cooperating with the other cutter for cutting another fillet.

19. In an apparatus of the class described, the combination of means providing a path for the translation of fish therethrough, cutters disposed at longitudinally spaced points in the path, feeding rolls cooperating with one cutter for cutting a fillet from the fish, means between the cutters for removing the cut fillet from the path, and feeding rolls cooperating with the other cutter for cutting another fillet.

Signed by me at Boston, Massachusetts, this 23rd day of January, 1928.

ERNEST A. GALLISON.